United States Patent
Surnilla et al.

(10) Patent No.: US 9,840,975 B2
(45) Date of Patent: Dec. 12, 2017

(54) METHOD AND SYSTEM FOR SECONDARY FLUID INJECTION CONTROL IN AN ENGINE

(71) Applicant: Ford Global Technologies, LLC, Dearborn, MI (US)

(72) Inventors: Gopichandra Surnilla, West Bloomfield, MI (US); Richard E. Soltis, Saline, MI (US); Daniel A. Makled, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 520 days.

(21) Appl. No.: 14/539,716

(22) Filed: Nov. 12, 2014

(65) Prior Publication Data
US 2016/0131048 A1    May 12, 2016

(51) Int. Cl.
| | | |
|---|---|---|
| F02D 19/06 | (2006.01) | |
| F02D 41/00 | (2006.01) | |
| F02D 19/12 | (2006.01) | |
| F02D 41/14 | (2006.01) | |

(52) U.S. Cl.
CPC ......... *F02D 41/0025* (2013.01); *F02D 19/12* (2013.01); *F02D 41/1456* (2013.01); *F02D 2041/1472* (2013.01); *Y02T 10/36* (2013.01)

(58) Field of Classification Search
CPC . Y02T 10/36; F02D 41/0025; F02D 41/1456; F02D 2041/1472; F02D 19/12
See application file for complete search history.

(56) References Cited

U.S. PATENT DOCUMENTS

| | | | |
|---|---|---|---|
| 5,348,630 A | * | 9/1994 | Yagi .................. G01N 27/4065 204/426 |
| 8,096,283 B2 | | 1/2012 | Surnilla et al. |
| 8,522,749 B2 | | 9/2013 | Surnilla et al. |
| 8,752,534 B2 | | 6/2014 | Soltis |
| 2010/0236532 A1 | * | 9/2010 | Xiao .................... F02D 41/146 123/677 |

(Continued)

OTHER PUBLICATIONS

Surnilla, Gopichandra et al., "System and Methods for Operating an Exhaust Gas Recirculation Valve Based on a Temperature Difference of the Valve," U.S. Appl. No. 14/616,496, filed Feb. 6, 2015, 67 pages.

(Continued)

*Primary Examiner* — Hieu T Vo
*Assistant Examiner* — Arnold Castro
(74) *Attorney, Agent, or Firm* — Julia Voutyras; McCoy Russell LLP

(57) ABSTRACT

Methods and systems are provided for adjusting the amount of secondary fluid being injected into an engine. In one example, a method may include adjusting an amount of secondary fluid injected at an engine cylinder based on a secondary fluid injection amount estimated from outputs of an exhaust oxygen sensor. For example, the secondary fluid injection amount may be estimated based on a first change in pumping current of the exhaust oxygen sensor between a first and second reference voltage when only fuel is injected into the engine cylinder and a second change in pumping current of the exhaust oxygen sensor between the first and second reference voltage when fuel and the secondary fluid are injected into the engine cylinder.

17 Claims, 6 Drawing Sheets

(56) References Cited

U.S. PATENT DOCUMENTS

| | | | |
|---|---|---|---|
| 2011/0132340 A1* | 6/2011 | Soltis | F02D 41/0025 |
| | | | 123/703 |
| 2011/0132342 A1* | 6/2011 | Soltis | F02D 41/0025 |
| | | | 123/703 |
| 2013/0218438 A1 | 8/2013 | Surnilla et al. | |
| 2014/0041381 A1 | 2/2014 | Kuske et al. | |
| 2014/0156172 A1 | 6/2014 | Surnilla et al. | |
| 2014/0200796 A1 | 7/2014 | Bidner et al. | |
| 2014/0202426 A1* | 7/2014 | Surnilla | F02D 17/02 |
| | | | 123/349 |
| 2014/0202434 A1 | 7/2014 | Leone et al. | |
| 2014/0202437 A1* | 7/2014 | Surnilla | F02D 41/0055 |
| | | | 123/568.22 |
| 2014/0290597 A1 | 10/2014 | Rumpsa | |
| 2014/0290630 A1 | 10/2014 | Pursifull | |
| 2014/0311443 A1 | 10/2014 | Leone et al. | |
| 2015/0047603 A1* | 2/2015 | Surnilla | F02D 41/0007 |
| | | | 123/350 |
| 2015/0075502 A1* | 3/2015 | Surnilla | F02M 25/08 |
| | | | 123/520 |
| 2015/0192084 A1* | 7/2015 | Surnilla | F02D 41/123 |
| | | | 123/674 |
| 2015/0192085 A1* | 7/2015 | Surnilla | G01M 15/104 |
| | | | 123/434 |
| 2016/0109422 A1* | 4/2016 | Makled | G01N 33/0073 |
| | | | 73/23.32 |
| 2016/0131048 A1* | 5/2016 | Surnilla | F02D 41/0025 |
| | | | 701/104 |
| 2016/0245198 A1* | 8/2016 | Surnilla | G01M 15/104 |

OTHER PUBLICATIONS

Surnilla, Gopichandra et al., "Method for Estimating Charge Air Cooler Condensation Storage and/or Release with an Intake Oxygen Sensor," U.S. Appl. No. 13/967,968, filed Aug. 15, 2013, 57 pages.

Rollinger, John E. et al., "Method for Estimating Charge Air Cooler Condensation Storage and/or Release with Two Intake Oxygen Sensors," U.S. Appl. No. 13/967,943, filed Aug. 15, 2013, 58 pages.

Surnilla, Gopichandra et al., "Method and System for Adjusting Engine Airflow Based on Output from an Oxygen Sensor," U.S. Appl. No. 14/063,896, filed Oct. 25, 2013, 36 pages.

Surnilla, Gopichandra et al., "Method for Estimating Charge Air Cooler Condensation Storage with an Intake Oxygen Sensor," U.S. Appl. No. 14/065,147, filed Oct. 28, 2013, 39 pages.

Vigild, Christian W. et al., "Methods and Systems for Fuel Canister Purge Flow Estimation with an Intake Oxygen Sensor," U.S. Appl. No. 14/155,261, filed Jan. 14, 2014, 51 pages.

Styles, Daniel J. et al., "Method for Estimation Charge Air Cooler Condensation Storage with an Intake Oxygen Sensor with Exhaust Gas Recirulation is Flowing," U.S. Appl. No. 14/192,765, filed Feb. 27, 2014, 49 pages.

Makled, Daniel A. et al., "Methods and Systems for Operating a Variable Voltage Oxygen Sensor." U.S. Appl. No. 14/517,601, filed Oct. 17, 2014, 42 pages.

\* cited by examiner

METHOD AND SYSTEM FOR SECONDARY FLUID INJECTION CONTROL IN AN ENGINE

FIELD

The present description relates generally to methods and systems for adjusting injection of a primary fuel and secondary fluid into an internal combustion engine.

BACKGROUND/SUMMARY

Knock control fluids have been developed to mitigate various abnormal combustion events in engine cylinders. For example, various combinations of gasoline, ethanol, methanol, other alcohols, water, washer fluid, and other inert fluids may be direct injected into an engine cylinder in response to an indication of untimely detonation. Specifically, dual fuel systems may inject a primary fuel and secondary fluid including a knock control fluid such as water.

One example approach for injecting a knock control fluid to mitigate cylinder abnormal combustion is shown by Leone et al in US 2014/0202434. Therein, knock is addressed by injecting water into an engine cylinder to increase scavenging and then adjusting the water injection amount based exhaust oxygen content, knock, and additional engine operating parameters. However, the inventors herein have recognized that there may be potential issues associated with adjusting a water injection amount based on engine operating parameters alone. For example, the amount of water actually injected into the cylinder may be more or less than actually desired based on engine operating parameters. As a result, the engine may be exposed to knock (if the water injection amount is less than desired) or water may condense within the engine cylinder, thereby leading to dilution of oil with water (if the water injection amount is more than desired).

In one example, the issues described above may be addressed by a method for adjusting an amount of secondary fluid injected at an engine cylinder based on a first change in pumping current of an exhaust oxygen sensor between a first and second reference voltage when only fuel is injected into the engine cylinder and a second change in pumping current of the exhaust oxygen sensor between the first and second reference voltage when fuel and the secondary fluid are injected into the engine cylinder. As one example, the oxygen sensor is positioned in an exhaust passage downstream of the engine cylinder. Further, an engine controller may determine an estimated amount of secondary fluid injected at the engine cylinder based on a difference between the second output and the first output. As such, the engine controller may adjust the amount of secondary fluid injected at the engine cylinder based on the determined estimated amount secondary fluid injected. For example, the method may include increasing or decreasing the amount of secondary fluid injected at the engine cylinder responsive to the estimated amount of secondary fluid being a threshold amount different than a desired amount of secondary fluid injection. The desired amount of secondary fluid injection may be based on engine operating conditions such as knock, engine temperature, exhaust gas temperature, an amount of exhaust gas in the engine cylinder, and an oxygen content of exhaust gas, and the like. The desired amount of secondary fluid injected at the engine may also be based on a water content of the secondary fluid, as determined based on a change in pumping current of the oxygen sensor between the first and second reference voltage upon injecting a known fraction of secondary fluid at the engine cylinder. Thus, an actual amount of secondary fluid injected at the engine cylinder may be estimated based on outputs of the oxygen sensor during injection of just fuel and injection of fuel and secondary fluid. In this way, the control of secondary fluid injection may be increased, thereby reducing the occurrence of knock and also condensation within the engine cylinder.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
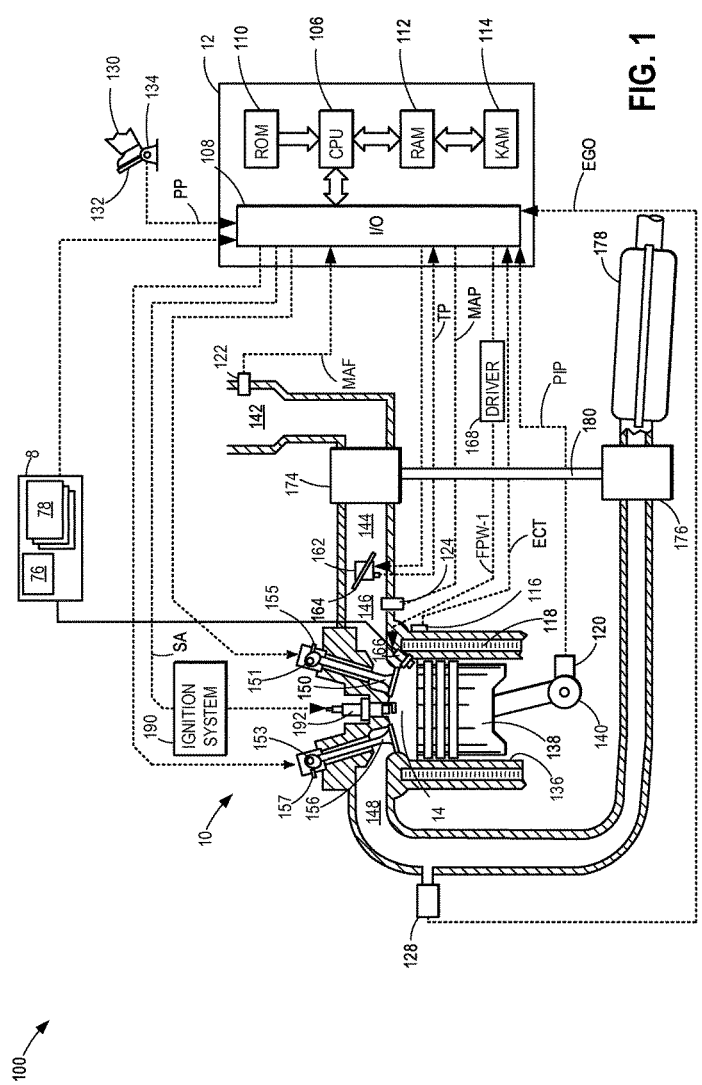
FIG. 1 shows a schematic diagram of an engine including an exhaust oxygen sensor.
Figure 4:
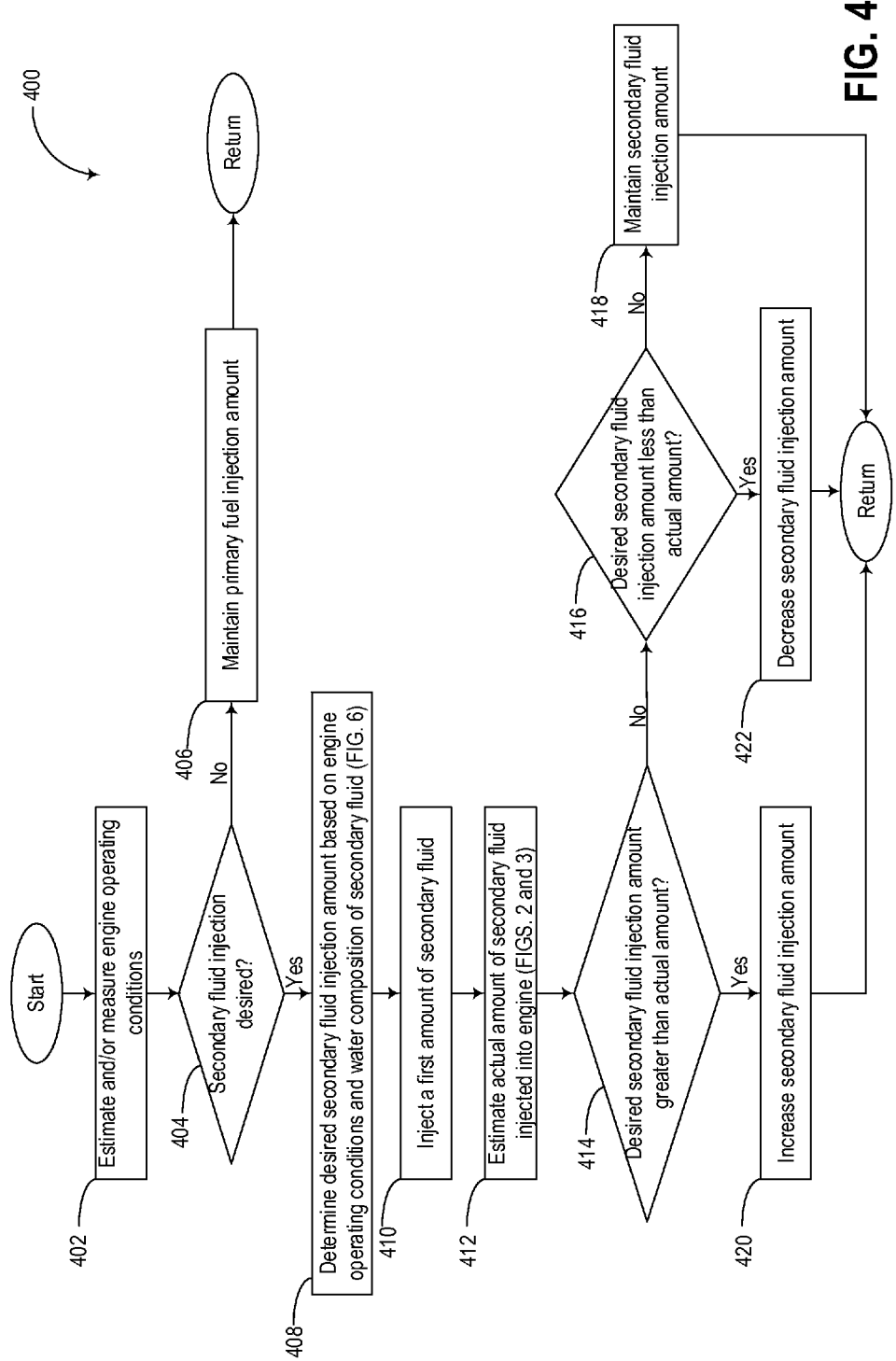
FIG. 4 shows a flow chart illustrating a method for adjusting an amount of secondary fluid being injected into an engine.
Figure 5:
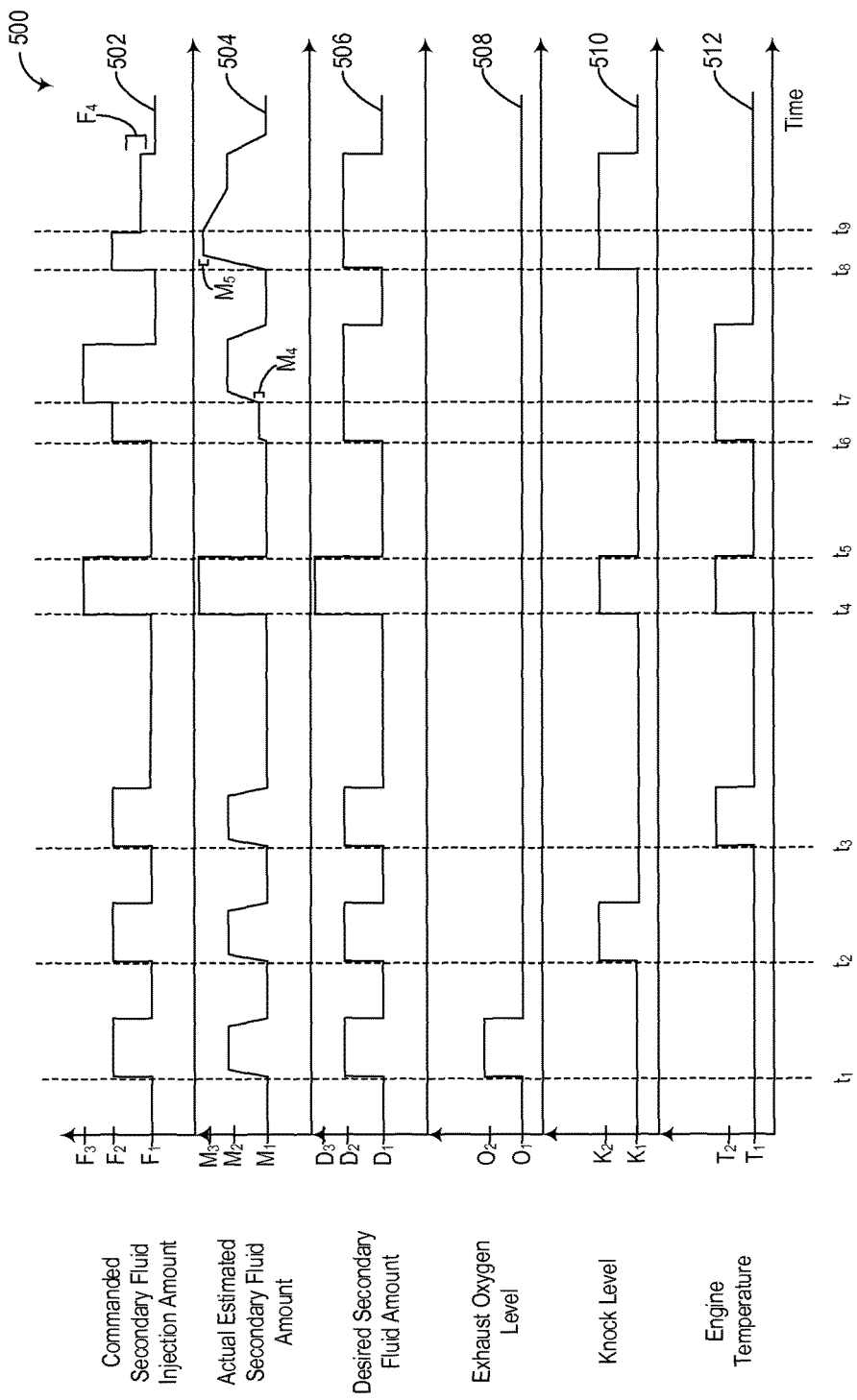
FIG. 5 shows a graph depicting how the amount of secondary fluid being injected into an engine may be adjusted during engine operation.
Figure 6:
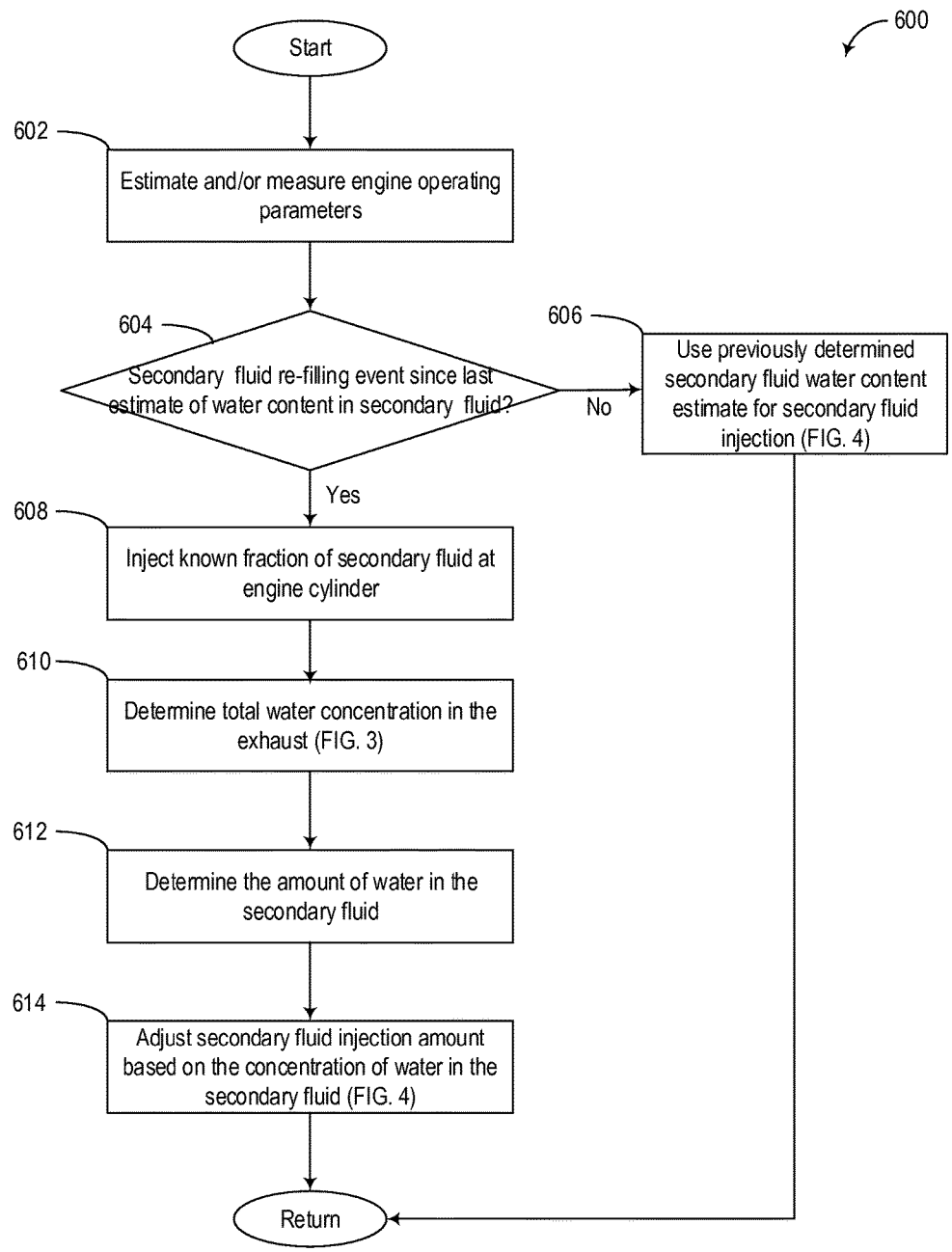
FIG. 6 shows a flow chart illustrating a method for determining a water content of secondary fluid used for injection at an engine cylinder.

The following description relates to systems and methods for adjusting the amount of secondary fluid being injected into an engine. A vehicle engine, as shown in FIG. 1, may be a dual-fuel engine with two or more reservoirs which may house primary fuel and/or a secondary fluid (e.g. water-alcohol mixture) to be injected into the engine's cylinders. The secondary fluid may be used to mitigate abnormal cylinder combustion, herein referred to as engine knock. The desired amount of secondary fluid to be injected into the engine cylinders may be dictated by feedback from a plurality of sensors providing information about various engine operating parameters (e.g. engine temperature from a temperature sensor). In another example, the desired amount of secondary fluid to be injected into the engine cylinders may be based on a water composition of the secondary fluid. A method for determining the water composition of the secondary fluid during engine operation is shown at FIG. 6. In some examples, the actual amount of secondary fluid injected into the engine cylinders may differ from the desired amount. To more accurately measure the amount of secondary fluid injected into the engine cylinders, the engine may include an oxygen sensor located in an exhaust passage of the engine. The oxygen sensor may be a variable voltage (VVs) oxygen sensor, capable of measuring the water content of exhaust gas as described by the method in FIG. 3. By measuring the amount of water in the exhaust gas when a secondary fluid is being injected into engine cylinders and when only primary fuel is being injected, the actual amount of secondary fluid injected in the engine cylinders may be determined based on the difference in the two water content measurements, as described by the method in FIG. 2. The amount of secondary fluid being injected into the engine cylinders may then be adjusted until the actual measured amount matches the desired amount based on engine operating parameters, as shown in FIGS. 4 and 5.

FIG. 1 depicts an example vehicle system 100 including an internal combustion engine 10. Engine 10 may be a dual fuel engine operating with a primary fuel and a secondary fluid, the secondary fluid being water or an alcohol-water mixture. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also referred to as a "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or alternatively may be provided upstream of compressor 174.

Exhaust passage 148 may receive exhaust gases from other cylinders of engine 10 in addition to cylinder 14. A variable voltage (VVs) oxygen sensor 128 is shown coupled to exhaust passage 148 upstream of emission control device 178. A reference voltage of the VVs oxygen sensor 128 may be modulated between a lower or base voltage at which oxygen is detected (and water is not dissociated) and a higher voltage at which water molecules in the gas flow may be dissociated. For example, during base operation, the oxygen sensor may operate at the base reference voltage. At the base reference voltage, when water hits the sensor, the heated element of the sensor may evaporate the water and measure it as a local vapor or diluent. The oxygen sensor may also operate in a second mode wherein the reference voltage is increased from the base reference voltage (e.g., first reference voltage) to a second reference voltage. The second reference voltage may be higher than the base reference voltage. When the intake oxygen sensor operates at the second reference voltage, the heated element of the sensor dissociates water in the air and subsequently measures the water concentration. Thus, the resulting pumping current of the sensor at the second reference voltage may be indicative of an amount of oxygen in the gas flow plus an amount of oxygen from dissociated water molecules. A change in pumping current between the first voltage and the second voltage may then be indicative of an amount of water in a gas flow in which the oxygen sensor is position.

In this way, the VVs oxygen sensor 128 may be used to estimate and/or measure the oxygen content of exhaust gas exhausted from the engine. The VVs oxygen sensor may also be used to estimate an amount of alcohol in the fuel burned in the engine and ambient humidity.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. A cam timing may be adjusted (by advancing or retarding the VCT system) to adjust an engine dilution in coordination with an EGR flow and/or a direct injection of a knock control fluid, thereby reducing EGR transients and improving engine performance.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock control fluid thereto. In some embodiments, the knock control fluid may be a fuel, wherein the injector is also referred to as a fuel injector. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Primary fuel may be delivered to fuel injector 166 from a high pressure fuel system 8 including one or more tanks 78, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, fuel tanks 78 may have a pressure transducer providing a signal to controller 12. It will be appreciated that, in an alternate embodiment, injector 166 may be a port injector providing fuel into the intake port upstream of cylinder 1. Knock control fluid (herein also referred to as secondary fluid) may be stored in reservoir 76. As elaborated herein, reservoir 76 may be included in the fuel system 8, coupled to a direct injector of the cylinder. This allows the secondary fluid to be direct injected to provide knock control. The secondary fluid may also be coupled to a windshield wiper system (not shown) to be used for windshield wiping purposes.

The secondary fluid stored in reservoir 76 may include a combination of water and alcohol and one or more non-ionic surfactants. These may include, for example, ethoxylates, poly-alcohols, or a combination thereof. In general, these may be molecules with hydrophilic side-chains. The hydrophilic side-chains may include polyethylene oxide side-chains or a combination of polyethylene and polypropylene oxide side-chains. Non-limiting examples include Nonoxynol-9 and Triton X-100. As a result, the secondary fluid stored in reservoir 76 may be a non-electrolytic, non-corrosive aqueous fluid. When direct injected into a cylinder for knock control, the use of non-ionic components in the wiper fluid reduces the risk of contamination of the combustion chamber and exhaust system with aggressive and recalcitrant metal salts. In another example, the secondary fluid stored in reservoir 76 may be water or a water-alcohol mixture.

While reservoir 76 is depicted as being distinct from the one or more fuel tanks 78, it will be appreciated that in alternate examples, reservoir 76 may be one of the one or more fuel tanks 78. Reservoir 76 may be coupled to direct injector 166 so that secondary fluid can be directly injected into cylinder 14. During some conditions, in response to an indication of knock, an engine controller may directly inject secondary fluid into the cylinder to increase engine dilution and thereby control the untimely and unwanted detonation event. As discussed above, the secondary fluid stored in reservoir 76 may be formulated to include a combination of water and alcohol and optionally one or more non-ionic surfactants such as 40% methanol. These non-ionic components allow the secondary fluid to retain windshield cleaning properties while reducing the risk of contaminating and corroding the combustion chamber and exhaust system with aggressive and recalcitrant metal salts. Example compositions of the secondary fluid that may be used for knock control as well as windshield wiping include ethanol and methanol solutions without soap. Alternatively, the secondary fluid may comprise mostly water and not include the one or more non-ionic surfactants. In yet another example, the secondary fluid may comprise only water.

It will also be appreciated that while in one embodiment, the engine may be operated by injecting the variable fuel or secondary fluid blend via a single direct injector; in alternate embodiments, the engine may be operated by using two injectors (a direct injector 166 and a port injector) and varying a relative amount of injection from each injector.

Fuel may be delivered by the injector to the cylinder during a single cycle of the cylinder. Further, the distribution and/or relative amount of fuel or knock control fluid delivered from the injector may vary with operating conditions, such as aircharge temperature, as described herein below. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel tanks 76 and 78 in fuel system 8 may hold one or more fuels (e.g., primary fuels) and/or secondary fluids (e.g., knock control fluids) with different qualities, such as different compositions. These differences may include different alcohol content, different water content, different octane, different heat of vaporizations, different fuel blends, different water contents, different flammability limits, and/or combinations thereof etc. In one example, fuels with different alcohol contents could include one fuel being gasoline and another fuel being ethanol or methanol. Other alcohol containing fuels could be a mixture of alcohol and water, a mixture of alcohol, water, etc. In still another example, both a first fuel and secondary fuel may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. Additionally, the first and second fuels may also differ in other fuel qualities such as a difference in temperature, viscosity, octane number, latent enthalpy of vaporization etc.

Moreover, fuel characteristics of the fuel or secondary fluid stored in the fuel tanks may vary frequently. The day to day variations in tank refilling can thus result in frequently varying fuel compositions, thereby affecting the fuel composition delivered by injector 166.

In some embodiments, the secondary fluid may be generated on board the vehicle from exhaust condensate, charge air cooler condensate, AC condensate drain, or rainwater drain. For example, both the water and the alcohol in the secondary fluid composition may be self-generated from water drained from the exhaust, charge air cooler, AC and/or rainwater drain, and alcohol separated from fuel in the fuel tank. By self-generating the components of the secondary fluid, the number of consumables on the vehicle system may be reduced.

While not shown, it will be appreciated that the engine may further include one or more exhaust gas recirculation passages for diverting at least a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. The one or more EGR passages may include an LP-EGR passage coupled between the engine intake upstream of the turbocharger compressor and the engine exhaust downstream of the turbine, and configured to provide low pressure (LP) EGR. The one or more EGR passages may further include an HP-EGR passage coupled between the engine intake downstream of the compressor and the engine exhaust upstream of the turbine, and configured to provide high pressure (HP) EGR. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. The LP-EGR flow through the LP-EGR passage may be adjusted via an LP-EGR valve while the HP-EGR flow through the HP-EGR passage may be adjusted via an HP-EGR valve (not shown).

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system, and/or a knock sensor. In response to the signals received from the various sensors, the controller may operate various engine actuators. Example actuators include fuel injector 166, throttle 162, cams 151 and 153, etc.

Storage medium read-only memory 110 can be programmed with computer readable data representing instructions executable by processor 106 for performing the methods described below as well as other variants that are anticipated but not specifically listed. An example routine that may be performed is elaborated with reference to FIGS. 2-4.

In this way, the system of FIG. 1 is configured to store a secondary fluid including water in a reservoir coupled to a cylinder direct injector, and deliver the fluid from the reservoir to each of the cylinders. For example, in response to knock, the controller may direct inject the secondary fluid into the cylinder from the reservoir coupled to the direct injector. In another example, the controller may also direct inject varying ratios of primary fuel to secondary fluid into the engine cylinders based on engine operating conditions.

Further, the system of FIG. 1 provides for a system for a dual fuel engine comprising: an engine cylinder, an exhaust oxygen sensor positioned in an exhaust passage downstream of the engine cylinder, and a controller with computer readable instructions for adjusting an amount of secondary fluid injected at the engine cylinder based on a difference between a desired secondary fluid injection amount and an estimated secondary fluid injection amount, the estimated secondary fluid injection amount based on a difference between a first change in pumping current of the exhaust oxygen sensor between a first and second reference voltage when fuel and secondary fluid are being injected into the engine cylinder a second change in pumping current of the exhaust oxygen sensor between the first and second reference voltage when only fuel is being injected into the engine cylinder. The method for adjusting the amount of water injected at the engine cylinder will be elaborated in the method of FIG. 4. In one example, the secondary fluid may be water. In another example, the secondary fluid may be an alternate fluid containing water, such as windshield washer fluid. In this example, the desired secondary fluid injection amount may be based on a water content of the washer fluid (e.g., a fraction of water in the washer fluid), as determined by a method shown in FIG. 6.

The system for a dual fuel engine further comprises a fuel system including a primary fuel tank containing fuel, a secondary tank containing water, and a fuel injector injecting one or more of fuel and water into the engine cylinder.

Figure 2:
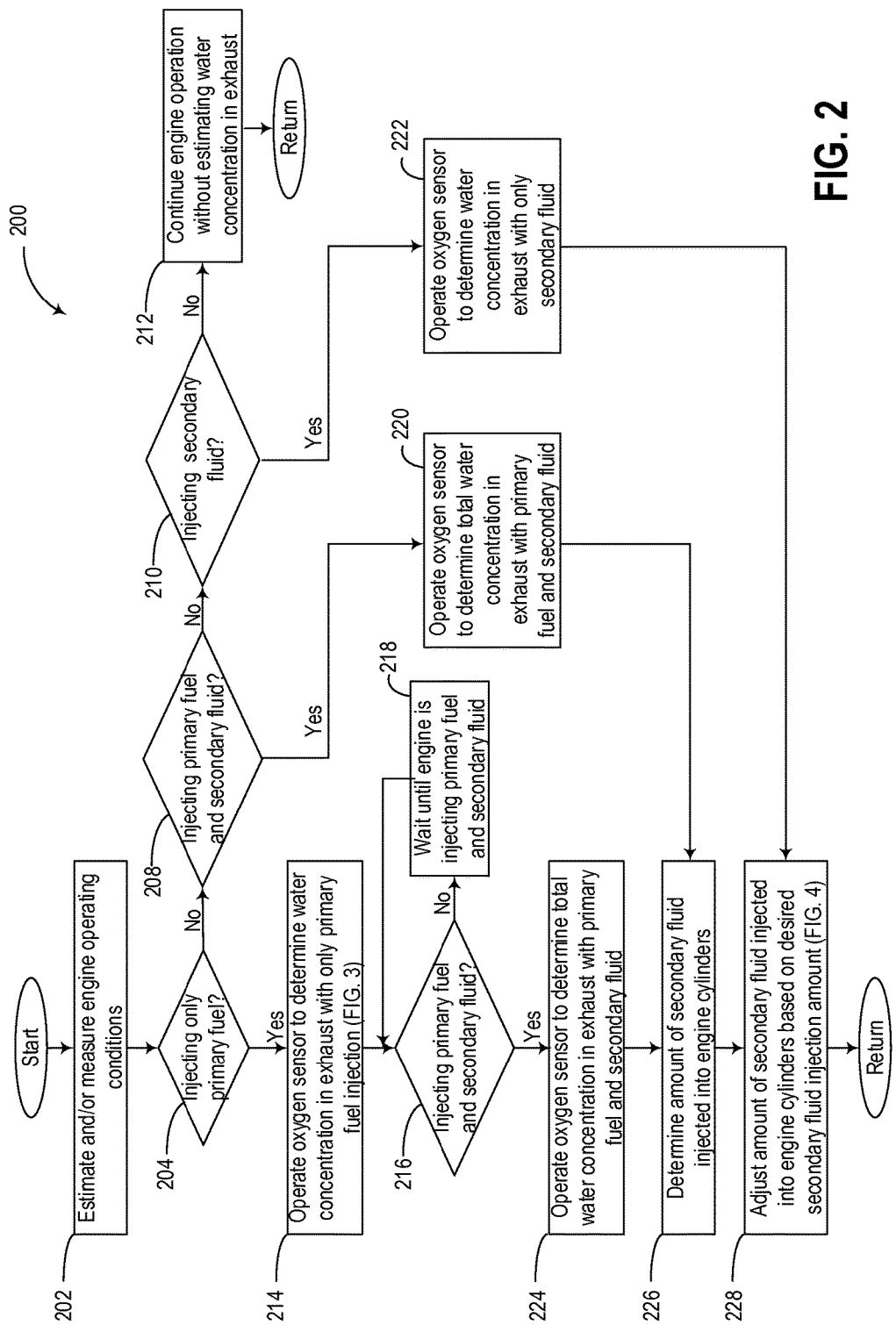
FIG. 2 shows a flow chart illustrating a method for determining an amount of secondary fluid being injected into an engine.

Turning now to FIG. 2, a flow chart of a method 200 for determining the amount of secondary fluid being injected into the engine cylinders is shown. In one example, a fuel system may include a primary fuel and a secondary fluid, such as water. During a cylinder combustion cycle, only primary fuel, only secondary fluid, or both primary fuel and secondary fluid may be injected into an engine cylinder. The injection of one or both of the primary fuel and secondary fluid may occur by one or more fuel injectors of the engine cylinder. As described below, injecting both primary fuel and secondary fluid into the engine cylinders may refer to injecting both primary fuel and secondary fluid into the engine cylinder during a same cylinder combustion cycle or during a same portion or stroke of the combustion cycle. Further, the primary fuel and secondary fluid may either be injected simultaneously by the same or dedicated fuel injectors or one after another by one or more fuel injectors. Instructions for carrying out method 200 may be stored on a memory of a controller (e.g., read only memory chip 106 of controller 12 shown in FIG. 1). As such, the controller may execute method 200 based on signals received from various engine sensors. The sensors may include: a knock sensor, exhaust oxygen sensor such as VVs oxygen sensor 128, and/or an exhaust temperature sensor. All of the engine sensors may provide feedback to the engine controller (e.g. controller 12) about engine operating conditions such as engine temperature, oxygen content in exhaust gas, secondary fluid constituent content in exhaust gas, knock levels, ratio of primary fuel to secondary fluids, etc.

Method 200 begins at step 202 by estimating and/or measuring engine operating conditions based on feedback from a plurality of sensors. Engine operating conditions may include engine temperature, oxygen content in exhaust gas, a ratio of primary fuel to secondary fluids, engine speed and load, an EGR flow, mass air flow, manifold pressure, etc.

Method 200 proceeds to 204 where the controller (e.g. controller 12) determines whether or not only primary fuel is being injected into the engine cylinders based on feedback from the above-mentioned sensors and/or feedback from the fuel injection system. If only primary fuel is being injected, then method 200 proceeds to 214 where the oxygen sensor (e.g. VVs oxygen sensor 128) is operated to determine the water concentration in the exhaust gas, downstream from the engine cylinders, and a first output of the oxygen sensor is generated. A reference voltage of the oxygen sensor (e.g., exhaust oxygen sensor) may be modulated between two different references voltages. The resulting pumping currents at the different two reference voltages may then be compared to one another to determine the water concentration of the exhaust gas (as elaborated below with reference to FIG. 3). Thus, the first output of the oxygen sensor is a first change in pumping current of the exhaust oxygen sensor when a reference voltage of the exhaust oxygen sensor is increased from a lower first voltage to a higher second voltage. Once the water concentration in the exhaust gas is determined when only primary fuel is being injected, the controller determines whether or not primary fuel and secondary fluid are being injected at 216. For example, the method at 216 may include determining if both primary fuel and secondary fluid, in combination, are being injected into the engine cylinder. In one example, injecting both primary fuel and secondary fluid may include injecting the primary fuel and secondary fluid during a same cylinder combustion cycle with one fuel injector. In another example, injecting both primary fuel and secondary fluid may include injecting the primary fuel and secondary fluid during a same combustion cycle with separate fuel injectors.

If secondary fluid is not being injected with the primary fuel, method 200 proceeds to 218 where the controller waits until primary fuel and secondary fluids are being injected at the same time (e.g., during a same combustion cycle). In one embodiment the secondary fluid may be a water-alcohol mixture. In another embodiment, the secondary fluid may be water mixed with one or more non-ionic surfactants (e.g. ethoxylates). In yet another embodiment, the secondary fluid may be only water.

When the controller detects that both primary fuel and secondary fluid are being injected at the engine cylinder(s), the controller then operates the oxygen sensor to determine the total water concentration in the exhaust gas with both primary fuel and secondary fluid being injected at 224. As described earlier, and elaborated in greater detail in the method described in FIG. 3, the oxygen sensor may operate at two different references voltages and the resulting change in pumping current between the two reference voltages may be used to determine the water concentration of the exhaust gas. Thus, the controller may receive a second output from the oxygen sensor wherein the second output is a second change in pumping current of the exhaust oxygen sensor when a reference voltage of the exhaust oxygen sensor is increased from a lower first voltage to a higher second voltage (e.g., modulated between the first voltage and second voltage).

Subsequently at 226, the controller determines the amount of secondary fluid injected into the engine cylinders. This may be achieved by comparing the water concentration determined at 214 with the water concentration determined at 224. Any change observed in the water concentration from 214 to 224 may be attributed to contributions from secondary fluid since secondary fluid is the only substance being injected into the engine cylinders in addition to primary fuel between steps 214 and 224. Thus, the water concentration in the exhaust gas with only primary fuel injection determined at 214 can be subtracted from the water concentration in the exhaust gas with primary fuel and secondary fluid injection determined at 224. The resulting water concentration may then be a constituent of the secondary fluid. The amount of secondary fluid may then be determined based on the determined amount of water injected at the engine cylinders and a known compositional relationship of water in the secondary fluid (e.g., secondary fluid may be comprised of 60% water). For example, if the secondary fluid is comprised of 60% water, then the total amount of secondary fluid injected into the engine is the determined amount of water injected divided by 0.6.

If at 204 the controller determines that primary fuel is not the only substance being injected into the engine cylinders, then method 200 proceeds to 208 where the controller determines if both primary fuel and secondary fluid are being injected into an engine cylinder with one or more fuel injections. If primary fuel and secondary fuel are not being injected into the engine cylinders, then the controller determines if secondary fluid is being injected into the engine cylinders at 210. For example, the method at 210 may include determining if only secondary fluid is being injected into the engine cylinders. If neither secondary fluid nor primary fuel are being injected, then only ambient air may be flowing through the engine cylinder. As a result, method 200 proceeds to 212, where the controller continues engine operation without estimating the water concentration in the exhaust. Since only ambient air may be flowing through the engine cylinder, there is no need for the controller to measure the water content of exhaust gas at 212. If at 210 the controller determines that secondary fluid is in fact being injected to the engine cylinders (and no primary fuel is being injected), then the controller operates the oxygen sensor to determine the water concentration in the exhaust with only secondary fluid being injected to the engine cylinders at 222. As described earlier, the oxygen sensor may apply two different references voltages and the resulting pumping currents can then be compared to determine the water concentration of the exhaust gas (See the method in FIG. 3 for a description of how water concentration is determined). Since secondary fluid is the only substance being injected to the engine cylinders at 222, the water concentration of the exhaust gas determined at 222 corresponds directly to the amount of secondary fluid being injected at the engine cylinders. The amount of secondary fluid injected may be estimated by the controller using a known compositional relationship of water in the secondary fluid (e.g. secondary fluid may be comprised of 60% water). Once the amount of secondary fluid is determined, the controller may adjust the amount of secondary fluid injected to the engine cylinders based on a desired secondary fluid injection amount at 228. The desired secondary fluid injection amount may be based on engine operating parameters such as engine temperature and exhaust oxygen content, as described further below with reference to FIG. 4.

If at 208 the controller determines that primary fuel and secondary fluid are both being injected, then method 200 continues to 220 where the controller operates the oxygen sensor to determine the total water concentration in the exhaust with both primary fuel and secondary fluid. In this case the controller may determine the amount of water being injected using the same method as described above at 214. Then at 226, the controller may determine the amount of secondary fluid injected into the engine cylinders. When arriving at 226 from 220, the controller may utilize a previously determined water concentration level from a previous cycle when only primary fuel was being injected. Thus, the amount of secondary fluid may be based on the water content of the exhaust when primary fuel and secondary fluid are being injected, as determined at 220, and a previously determined water content of the exhaust gas when only primary fuel was being injected into the engine cylinders. Since method 200 is repeatedly ongoing, if, during a particular cycle, method 200 proceeds from 204 to 208 to 220, then for that cycle the controller does not estimate the water concentration during solely primary fuel injection. Thus, the controller may use a water concentration estimate determined at 214 from a previous cycle in order to estimate the amount of secondary fluid for that cycle.

After determining the amount of secondary fluid at 226, the controller adjusts the amount of secondary fluid injected to the engine cylinders based on a desired secondary fluid injection amount at 228. If the actual, or estimated, amount of secondary fluid injected to the engine cylinders as determined at 226 is different than the desired amount, the controller may adjust the amount of secondary fluid injected to the engine cylinders accordingly. In one example if the estimated amount of injected secondary fluid is less than the desired amount, then the controller may increase the amount of secondary fluid injected to the engine cylinders. In another example, the controller may decrease the amount of secondary fluid injected to the engine cylinders if the estimated injected amount is greater than the desired amount. The desired secondary fluid injection amount may be based on engine operating parameters such engine knock, engine temperature, temperature of exhaust gas, amount of exhaust gas in the engine cylinder, and oxygen content of the exhaust gas (see FIG. 4 for a description of how the desired secondary fluid injection amount is determined). As one example, if the engine temperature exceeds a threshold of a level, then the desired amount of secondary fluid may increase as described in greater detail in FIG. 4.

Thus, method 200 entails adjusting an amount of secondary fluid injected at an engine cylinder based on a first change in pumping current of an exhaust oxygen sensor between a first and second reference voltage when only fuel is injected into the engine cylinder and a second change in pumping current of the exhaust oxygen sensor between the first and second reference voltage when fuel and the secondary fluid are injected into the engine cylinder. For example, the change in pumping current of the exhaust oxygen sensor may be a change in pumping current upon increasing a reference voltage of the exhaust oxygen sensor from the first reference voltage to the secondary reference voltage. Method 200 further comprises determining an estimated amount of secondary fluid injected at the engine cylinder based on a difference between the second change in pumping current and the first change in pumping current. The difference between the second change in pumping current and the first change in pumping current of the oxygen sensor may be used to estimate the amount of secondary fluid injected at the engine cylinder. In other words method 200 comprises adjusting an amount of water injected at the engine cylinder based on a difference between a desired water injection amount and an estimated water injection amount, the estimated water injection amount based on a difference between a first change in change in pumping current of the exhaust oxygen sensor when fuel and water are being injected into the engine cylinder a second change in change in pumping current of the exhaust oxygen sensor when only fuel is being injected into the engine cylinder.

Figure 3:
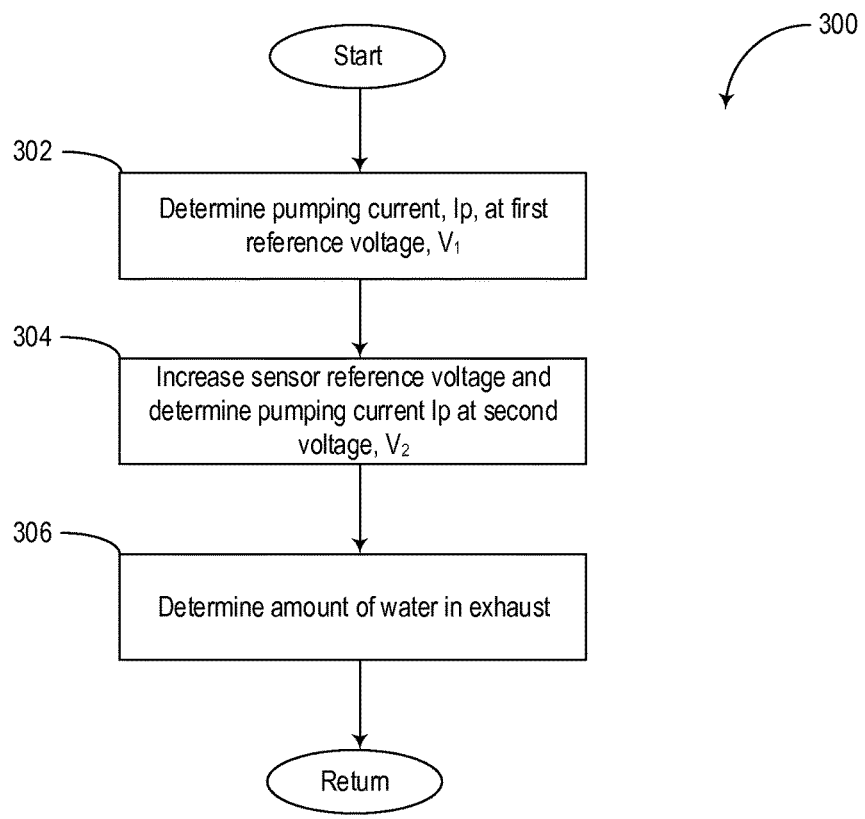
FIG. 3 shows a flow chart illustrating a method for operating an exhaust gas sensor to determine an amount of water in exhaust gas.

Turning to FIG. 3, a method 300 is shown for determining the amount of water in exhaust gas using an exhaust gas sensor. Method 300 may continue from method 200, as described above.

Method 300 begins at 302 in which the controller determines the pumping current, Ip, output by the oxygen sensor operating at a first reference voltage, $V_1$. The oxygen sensor may be a VVs exhaust oxygen sensor (e.g., VVs oxygen sensor 128) positioned in an exhaust passage of an engine downstream from the engine cylinder. The first reference voltage, $V_1$, may have a value such that oxygen is pumped from the cell of the oxygen sensor, but low enough that oxygen compounds such as water are not dissociated at the sensor (e.g., in one example, $V_1$ may be approximately 450 mV). Application of the first reference voltage $V_1$ may generate an output of the oxygen sensor in the form of a first pumping current, $Ip_1$, that is indicative of the amount of oxygen in the sample gas. The method then includes increasing the reference voltage of the oxygen sensor to a second voltage, $V_2$, and determining the pumping current output by the oxygen sensor at the second voltage $V_2$ at 304. The second voltage $V_2$ may be greater than the first voltage $V_1$ applied to the sensor. In particular, the second voltage $V_2$ may have a value high enough to dissociate a desired oxygen compound. For example, the second voltage $V_2$ may be high enough to dissociate water molecules into hydrogen and oxygen (e.g., in one example, $V_2$ may be approximately 1.1 V). Application of the second voltage $V_2$ may generate a second pumping current, $Ip_2$, that is indicative of the amount of oxygen and water in the sample gas. It will be understood that the term "water" in the "amount of oxygen and water" as used herein refers to the amount of oxygen from the dissociated water molecules in the sample gas. Subsequently at 306, the controller may determine the amount of water in the exhaust gas by subtracting the first pumping current at 302 from the second pumping current obtained at step 304. In one example, the method 300 may include continuously modulating the oxygen sensor reference voltage between the first and second voltages. The average change in pumping current during the modulation may then be used by the controller to determine the amount of water in the exhaust gas.

Moving on to FIG. 4, a method 400 is shown for adjusting the amount of secondary fluid being injected into an engine. Instructions for carrying out method 400 may be stored on a memory of a controller (e.g., read only memory chip 106 of controller 12 shown in FIG. 1). As such, the controller may execute method 400 based on signals received from various engine sensors.

Method 400 begins at 402 in which the controller (e.g. controller 12 from FIG. 1) estimates and/or measures engine operating conditions based on feedback from a plurality of engine sensors. Engine operating conditions may include engine speed and load, engine temperature, exhaust temperature, engine knock, an oxygen concentration of the exhaust gas, etc. Based on the engine operating conditions, the controller then determines at 404 if secondary fluid injection is desired. Secondary fluid injection may be desired if engine operating conditions (e.g. engine temperature, engine knock, and exhaust oxygen concentration) exceed pre-set threshold levels that may result in degradation of one or more of an engine's fuel injectors and/or engine cylinders as described further in FIG. 5 below. As an example, if a knock sensor detects knock in any one of the engine cylinders above a threshold level, then the controller may determine that secondary fluid injection is desired to reduce engine knock. If secondary fluid injection is not desired based on the engine operating conditions, then the controller maintains the primary fuel injection amount at 406. Said another way, the method at 406 may include continuing to inject only primary fuel and not secondary fluid.

If however any one or more of the engine operating conditions exceed threshold levels for injecting secondary fluid (e.g. oxygen exhaust concentration levels exceed a threshold level), the controller determines the desired secondary fluid injection amount at 408. The desired amount of secondary fluid injection may be based on one or more engine operating conditions such as engine knock, engine temperature, temperature of exhaust gas, amount of exhaust gas in the engine cylinder, and oxygen content of the exhaust gas. Thus, the controller may determine the desired amount of secondary fluid to be injected to the engine cylinders based on one or more of the engine parameters listed above. See FIG. 5 below for a greater description of how the desired secondary fluid injection amount may be determined. As one example, if the engine temperature exceeds a first threshold, then the controller may determine a first desired amount of secondary fluid to be injected. If the temperature exceeds a second threshold, then the controller may determine that a higher second amount of secondary fluid is desired to be injected. In another embodiment, the controller may determine the desired amount of secondary fluid injection based on a pre-set relationship between engine operating conditions (e.g., engine temperature, exhaust temperature, exhaust oxygen content, etc.) and desired secondary fluid injection amount. Thus, once engine operating conditions exceed one or more pre-set threshold levels, the desired amount of additional secondary fluid injection may scale with the amount that the operating conditions exceeds the first threshold. As an example, if the engine temperature exceeds a first threshold level and continues to increase above the threshold level, then the amount of desired secondary fluid injection may be proportional to the amount of increase of the engine temperature.

Additionally at 408, the desired amount of secondary fluid may be determined based on the water composition of the secondary fluid (e.g., concentration of water in the secondary fluid). After refilling a secondary fluid reservoir with secondary fluid, the secondary fluid within the reservoir and used for secondary fluid injection may have a different water composition than it had before refilling. For example, if the secondary fluid is windshield washer fluid, different brands of washer fluid in different locations may have different water and methanol compositions (e.g., differ water to methanol ratios). The composition of water in the secondary fluid may affect the desired amount of secondary fluid to be injected to the engine cylinder. Thus, as described further in FIG. 6, the secondary fluid injection amount may be adjusted based on the concentration of water in the secondary fluid. In one embodiment, if the secondary fluid is water, the water composition may be assumed to be substantially 100% without requiring a water content estimate from the method of FIG. 6.

Returning to method 400, once the controller has determined the desired secondary fluid injection amount, method 400 continues to 410, where the controller injects a first amount of secondary fluid to the engine cylinders. The first amount is the amount of secondary fluid for injection determined at 408. The controller may accomplish this by sending a signal to the injector (e.g. fuel injector 166) to inject the desired first amount of secondary fluid. Next, the controller estimates the actual amount of secondary fluid injected to the engine (after injecting the first amount of secondary fluid) at 412 using the methods described in FIGS. 2 and 3. As described in FIGS. 2-3, the first output of the exhaust oxygen sensor when only fuel (e.g., primary fuel) is injected into the engine cylinder is compared to a second output of the exhaust oxygen sensor when fuel and the secondary fluid are injected into the engine cylinder.

After determining the estimated actual amount of secondary fluid injected at the engine cylinders, the controller then determines if the desired secondary fluid injection amount is greater than the actual amount estimated at 412 by a threshold amount. If the actual secondary fluid injection amount is less than the desired amount by more than a threshold amount, then the controller may increase the secondary fluid injection amount at 420 to a second amount. The controller may determine how much to increase the secondary fluid injection amount based on the magnitude of the difference between the actual secondary fluid injection amount and the desired amount which could be set by a series of threshold, or by a direct relationship between actual secondary fluid injection amount and desired amount. In one embodiment, there may be a series of thresholds representing different magnitudes of difference between the actual secondary fluid injection amount and the desired amount. Thus, if the difference between the actual secondary fluid injection amount and the desired amount is greater than a smaller first threshold, the controller increases the secondary fluid injection amount by a lower first amount. If the difference between the actual secondary fluid injection amount and the desired amount reaches a second higher threshold, then the controller increases the secondary fluid injection amount by a higher second amount. In another embodiment, the amount the controller increases the secondary fluid injection, may be proportional to the difference between the actual secondary fluid injection amount and the desired amount. Thus, once the difference between the actual secondary fluid injection amount and the desired amount reaches a first threshold, the controller increases the secondary fluid injection amount based on the magnitude of the difference between the actual secondary fluid injection amount and the desired amount. Thus, the smaller the actual secondary fluid injection amount is than the desired amount, the greater the increase of the secondary fluid injection.

If the controller determines the desired secondary fluid injection amount is not greater than the actual amount, it then determines if the desired secondary fluid injection amount is less than the actual amount at 416. If the actual secondary fluid injection amount is greater than the desired amount by more than a threshold amount, then the controller may decrease the secondary fluid injection amount at 422. The controller may determine how much to decrease the secondary fluid injection amount based on the magnitude of the difference between the actual secondary fluid injection amount and the desired amount which could be set by a series of thresholds, or by a direct proportional relationship between actual secondary fluid injection amount and desired amount, as described above.

If at 416, the controller determines that the desired secondary fluid injection amount is not less than the actual amount, then method 400 continues to 418 where the controller maintains the secondary fluid injection amount. If step 418 is reached, then the actual secondary fluid injection amount may substantially match the desired amount, and so, there is no need to adjust the actual secondary fluid injection amount. In another example, if the estimated actual secondary fluid injection amount is within a threshold of the desired secondary fluid injection amount (e.g., first amount), the controller may maintain the secondary fluid injection amount at the first amount (e.g., first level) at 418. Thus, method 400 comprises adjusting the amount of secondary fluid injected at the engine cylinder in response to the estimated amount of secondary fluid being a threshold amount different than a desired amount of secondary fluid injection, the desired amount of secondary fluid injection based on engine operating conditions. The engine operating conditions include one or more of engine knock, engine temperature, a temperature of exhaust gas, an amount of exhaust gas in the engine cylinder, and an oxygen content of the exhaust gas.

More specifically, 400 entails injecting a first amount of secondary fluid at an engine cylinder, determining an estimated amount of secondary fluid injected at the engine cylinder based on a first change in pumping current of an oxygen sensor when a reference voltage of the oxygen sensor is increased from a first to a second reference voltage, the oxygen sensor positioned downstream of the engine cylinder, during the injecting the first amount of secondary fluid and a second change in pumping current of the oxygen sensor when the reference voltage of the oxygen sensor is increased from the first to the second reference voltage during only injecting a first fuel at the engine cylinder, and injecting a second amount of secondary fluid at the engine cylinder, the second amount adjusted from the first amount based on the estimated amount of secondary fluid. The first fuel is a primary fuel and the secondary fluid is water. In an alternate example, the secondary fluid may be washer fluid or an alternate alcohol-water based fluid. The oxygen sensor is a variable voltage oxygen sensor adjustable between a lower base voltage (e.g., first reference voltage) where water is not dissociated at the oxygen sensor and a higher target voltage (e.g., second reference voltage) wherein water is dissociated at the oxygen sensor. Method 400 involves injecting the first fuel along with the secondary fluid during the injecting the first amount of secondary fluid.

Method 400 further comprises determining the estimated amount of secondary fluid injected at the engine cylinder based on a difference between the first change in pumping current and the second change in pumping current, wherein the first change in pumping current is indicative of a first amount of water in the first fuel and secondary fluid, and wherein the second change in pumping current is indicative of a second amount of water in the first fuel. Injecting the second amount of secondary fluid includes increasing injection of secondary fluid from the first amount to the second amount when the difference between the first output and the second output is less than a desired water injection amount. Injecting the second amount of secondary fluid includes decreasing injection of secondary fluid from the first amount to the second amount when the difference between the first output and the second output is greater than the desired water injection amount. The desired water injection amount is based on one or more of an engine knock level, a frequency of engine knock, engine temperature, a temperature of exhaust gas, an amount of exhaust gas in the engine cylinder, and an oxygen content of the exhaust gas. The first amount of secondary fluid is based on the desired water injection amount and the second amount of secondary fluid is based on the estimated amount of secondary fluid and the desired water injection amount.

Said another way, method 400 involves adjusting an amount of secondary fluid injected at an engine cylinder based on a first change in pumping current of an exhaust oxygen sensor between a first and second reference voltage when only fuel is injected into the engine cylinder and a second change in pumping current of the exhaust oxygen sensor between the first and second reference voltage when fuel and the secondary fluid are injected into the engine cylinder. The exhaust oxygen sensor may be a variable voltage oxygen sensor adjustable between the first and second reference voltage, where the second reference voltage is higher than the first reference voltage. The exhaust oxygen sensor is positioned in an exhaust passage of an engine downstream from the engine cylinder.

In one embodiment, the controller may detect degradation of one or more of the fuel injectors if the difference between the estimated secondary fluid injection amount and the desired fluid injection amount persists for a threshold duration. As an example, conditions when the estimated secondary fluid injection amount remains significantly different than the fluid injection amount for multiple engine cycles may indicate degradation of one or more of the fuel injectors. As such, under one embodiment, method 400 may further comprise indicating a condition of a secondary fluid injection system of an engine including the engine cylinder when the estimated amount of secondary fluid is the threshold amount different than the desired amount of secondary fluid injection for a duration, the duration including one or more of a number of engine cycles, a period of time, and a duration of engine use. The condition of the secondary fluid injection system includes degradation of one or more of a fuel injector injecting secondary fluid into the engine cylinder and an alternate component of the secondary fluid injection system.

Turning now to FIG. 5 a graph 500 is shown, depicting adjustments to the amount of secondary fluid injected into an engine based on engine operating conditions. Specifically, graph 500 shows changes in an exhaust oxygen level (e.g., content of oxygen in the exhaust gas) at plot 508, changes in an engine knock level at plot 510, and changes in engine temperature at plot 512. The exhaust oxygen levels may be measured by an exhaust oxygen sensor (e.g. VVs oxygen sensor 128), the knock level may be measured by a knock sensor located in the engine cylinder, and the engine temperature may be measured by a thermal sensor located in the combustion chamber. Additionally, graph 500 shows changes in a commanded secondary fluid injection amount at plot 502, changes in an actual estimated (e.g., measured) secondary fluid amount at plot 504, and a desired secondary fluid amount at plot 506. The actual estimated secondary fluid amount is determined based on outputs of an exhaust oxygen sensor, as described earlier in the methods of FIGS. 2 and 3. The commanded secondary fluid injection amount may be an amount of secondary fluid that is injected by the fuel injectors into the engine cylinders. For example, the commanded secondary fluid injection amount may be an amount of secondary fluid commanded by the controller to be injected by the fuel injectors. The commanded secondary fluid injection amount at plot 502 may be adjusted by the controller when the actual estimated secondary fluid injection amount differs from the desired secondary fluid injection amount, as described earlier in the method of FIG. 4. The desired secondary fluid injection amount may be determined by the controller based on engine operating conditions (e.g. engine knock, engine temperature, temperature of exhaust gas, amount of exhaust gas in the engine cylinder, and oxygen content of the exhaust gas).

As described earlier, secondary fluids are desired when engine knock reaches a threshold level that can cause engine degradation. While a knock sensor may be a direct way of measuring engine knock, engine temperature and exhaust oxygen content are also indicative of abnormal combustion conditions. If engine temperatures reach a threshold level, fuel in the engine cylinder may be ignited by the high ambient temperatures in the cylinder rather than by a spark from the spark plug. Thus, this may cause unintentional combustion events (e.g., pre-ignition) and lead to engine degradation. Further, high engine temperatures may cause additional unintentional combustion events after the initial spark event (e.g., knock). Injection of secondary fluid to the engine cylinder may cool the engine and mitigate knock. Exhaust oxygen content above a threshold level may indicate that fuel is being trapped in the engine cylinders. If fuel continues to be injected to the engine, but exhaust oxygen content rises, gas constituents from the primary fuel may not be reaching the exhaust oxygen sensor. Such a situation may arise when not all the gas and fuel in the cylinder leave the exhaust valve after a combustion event. Leftover fuel or gas in the engine cylinder may result in abnormal combustion events. Injection of secondary fluid to the engine cylinder may flush remaining fuel or gas out of the cylinder via scavenging. Thus, if engine knock, engine temperature, or exhaust oxygen content reach their respective thresholds, the controller may determine that secondary fluid injection is desired and command secondary fluid to be injected to engine cylinders by the fuel injectors.

As described above, the three depicted engine operating parameters (engine knock, engine temperature, and exhaust oxygen content are shown in plots 508, 510, and 512. It should be noted that the depicted engine operating parameters do not reflect all possible engine operating parameters, and that alternate or additional engine operating parameters may be measured by alternate or additional engine sensors (e.g., exhaust gas temperature sensor).

Starting before $t_1$, exhaust oxygen levels, engine knock levels, and engine temperature are at lower first levels, $O_1$, $K_1$, and $T_1$ respectively. As such, the desired secondary fluid amount remains constant at a lower first level, $D_1$ (plot 506), and the controller maintains the amount of secondary fluid injected to the engine cylinders at a lower first level, $F_1$ (plot 502). The actual estimated amount of secondary fluid injection also remains constant at a lower first level $M_1$ (plot 504), which is equivalent to $D_1$. In one embodiment, the lower first level $D_1$ may be approximately zero, and engine operating parameters may reach a corresponding threshold level before the controller determines that injecting secondary fluid into the engine cylinders is required. In another embodiment, secondary fluid may be desired in direct proportion to engine operating parameters. As an example, engine temperature may have to reach a threshold level before the controller determines that secondary fluid injection is desired. As another example, the controller may determine that secondary fluid injection is desired if any level of knock is detected, or alternatively knock may have to reach the first knock threshold $K_1$ before the controller determines that secondary fluid injection is desired.

At time $t_1$, exhaust oxygen levels increase to a higher second level $O_2$, (plot 508) and the controller determines that secondary fluid is desired at a higher second amount, $D_2$, from $D_1$. In response, the controller commands the secondary fluid injection amount to increase from a lower first level $F_1$ to a higher second level $F_2$ (plot 502). The actual estimated secondary fluid amount increases from a lower first level $M_1$ to a higher second level $M_2$ (plot 504) which is equivalent to the higher second amount $D_2$. Once exhaust oxygen content returns to a level similar to that of before time $t_1$ (e.g. $O_f$), the desired secondary fluid injection amount returns to the first lower level, $D_1$ and the secondary fluid injection amount returns to its first lower level $F_1$. The estimated secondary fluid amount also returns to a level relatively equivalent to that of $D_1$ (e.g. $M_1$). At time $t_2$, knock levels increase from a first lower level, $K_1$, to a higher second level, $K_2$. As a result, the controller determines that the desired secondary fluid injection amount should increase from the lower first level $D_1$ to a higher second level and subsequently commands the secondary fluid injection amount (by sending a command to the fuel injectors) to be increased a corresponding amount from a lower first level $F_1$ to a higher second level $F_2$. The actual estimated secondary fluid amount increases from a lower first level $M_1$ to a higher second level $M_2$ which is equivalent to the higher second amount $D_2$. Once knock levels return to a level similar to that before time $t_2$ (e.g. $K_1$), the desired secondary fluid injection amount and secondary fluid injection amount signaled from the controller return to levels similar to that of their respective lower first levels, $D_1$ and $F_1$. The estimated secondary fluid amount also returns to a level relatively equivalent to that of $D_1$ (e.g. $M_1$). At time $t_3$, engine temperatures increase from a lower first temperature, $T_1$, to a higher second temperature, $T_2$. The controller determines that the desired secondary fluid injection amount should increase from the lower first level $D_1$ to a higher second level $D_2$ and subsequently commands the secondary fluid injection amount to be increased a corresponding amount from $F_1$ to $F_2$. The actual estimated secondary fluid amount increases from a lower first level $M_1$ to a higher second level $M_2$ which is equivalent to the higher second amount $D_2$. Once engine temperature returns to a level similar to that before time $t_3$ (e.g. $T_1$), the desired secondary fluid injection amount returns a level similar to that of the first lower level, $D_1$ and the signaled secondary fluid injection amount returns to a level similar to that of its first lower level $F_1$. The estimated secondary fluid amount also returns to a level relatively equivalent to that of $D_1$ (e.g. $M_1$).

Moving forward in time to time $t_4$, both the knock level and engine temperature increase from lower first levels $K_1$ and $T_1$ respectively, to higher second levels, $K_2$ and $T_2$ respectively. As a result, the desired secondary fluid injection amount may increase from a lower first level $D_1$ to a higher third level, $D_3$, which may be an even great amount than second level $D_2$. Thus, the simultaneous increase of temperature and knock may require more secondary fluid than the increase of each one independently in order to reduce knock. The actual estimated secondary fluid amount increase mirrors that of the desired amount increase. Thus, the estimated secondary fluid injection amount increases from a lower first level $M_1$ to a higher second level $M_3$ which is equivalent to the higher third amount $D_3$. Once engine temperature and knock levels return to levels similar to that before time $t_4$, at time $t_5$ (e.g. $T_1$ and $K_1$), the desired secondary fluid injection amount returns to a level similar to that of the first lower level, $D_1$, and the signaled secondary fluid injection amount returns to a level similar to that of its first lower level $F_1$. The estimated secondary fluid amount also returns to a level relatively equivalent to that of $D_1$ (e.g. $M_1$).

Notice that before time $t_5$, the actual estimated secondary fluid amount as seen in plot 504 mirrors the desired secondary fluid amount seen in plot 506. The actual estimated secondary fluid amount is determined by the method as described earlier in FIGS. 2 and 3. Thus, the actual estimated secondary fluid amount $M_2$ is the same as the desired secondary fluid amount $D_2$, and similarly $M_3$ is the same value as $D_3$. However, after $t_5$, graph 500 shows how the secondary fluid injection amount may be adjusted by the controller when the estimated actual secondary fluid injection amount differs from the desired amount as described earlier in the method of FIG. 4.

At time $t_6$ engine temperature increases form a lower first level $T_1$ to a higher second level $T_2$ (plot 512). As a result, the desired amount of secondary fluid injection increases from a lower first amount $D_1$ to a higher second amount $D_2$ (plot 506). Subsequently, the controller increases the secondary fluid injection amount injected by the engine cylinder fuel injectors from a lower first level, $F_1$, to a higher second level, $F_2$. However, the secondary fluid injection amount that is estimated to be actually injected may be an amount $M_4$, which is less than the desired amount, $D_2$. The difference between the estimated secondary fluid injection amount $M_4$ and the desired amount $D_2$ may be greater than a threshold difference. In response to this difference between the estimated secondary fluid injection level and the desired secondary fluid injection amount, the controller may increase the secondary fluid injection amount from the second level $F_2$ to a higher third level $F_3$ (plot 502) at time $t_7$. As described earlier in the method of FIG. 4, the controller may determine the magnitude of increase from $F_2$ to $F_3$ based on the magnitude of the difference between the estimated secondary fluid injection amount and the desired amount. In one embodiment, the increase may be proportional to the difference between the actual secondary fluid injection amount and the desired amount. In another embodiment the magnitude of the difference between $M_4$ and $D_2$ may reach a threshold difference which dictates the magnitude of the increase from $F_2$ to $F_3$ (See method in FIG. 4). Once engine temperature returns to a level similar to that before time $t_6$ (e.g. $T_1$), the desired secondary fluid injection amount returns a level similar to that of the first lower level, $D_1$ and the signaled secondary fluid injection amount returns to a level similar to that of its first lower level $F_1$. The estimated secondary fluid amount also returns to a level relatively equivalent to that of $D_1$ (e.g. $M_1$).

Next, at time $t_8$, engine knock increases form a lower first level $K_1$ to a higher second level $K_2$. In response, the controller may determine that the desired amount of secondary fluid injection should increase from the lower first amount $D_1$ to the higher second amount $D_2$. Subsequently, the controller commands the fuel injectors to increase the secondary fluid injection amount from a lower first level, $F_1$, to a higher second level, $F_2$ (plot 502). However, the actual secondary fluid injection amount that is estimated by the outputs of the exhaust oxygen sensor may be an amount $M_5$, which is greater than the desired amount, $D_2$ by a threshold amount. In response to this difference between the actual estimated secondary fluid injection amount and the desired secondary fluid injection amount, the controller decreases the commanded secondary fluid injection amount from the higher second level $F_2$ to a lower fourth level $F_4$ which may be approximately zero. For example, $F_4$ may be substantially the same as $F_1$. In another embodiment, $F_4$ may be greater than $F_1$. In a further embodiment, $F_4$ may be less than $F_1$. As described earlier in the method of FIG. 4, the controller may determine the magnitude of decrease from $F_2$ to $F_4$ based on the magnitude of the difference between the actual secondary fluid injection amount and the desired amount. In one embodiment, the decrease from $F_2$ to $F_4$ may be proportional to the difference between the estimated secondary fluid injection amount and the desired amount. In another embodiment, the magnitude of the difference between $M_5$ and $D_2$ may reach a threshold difference which dictates the magnitude of the increase from $F_2$ to $F_4$ as described in greater detail in the method of FIG. 4. Once engine knock returns to a level similar to that before time $t_8$ (e.g. $K_1$), the desired secondary fluid injection amount returns a level similar to that of the first lower level, $D_1$ and the signaled secondary fluid injection amount returns to a level similar to that of its first lower level $F_1$. The estimated secondary fluid amount also returns to a level relatively equivalent to that of $D_1$ (e.g. $M_1$).

Graph 500 shows how the controller may adjust the amount of secondary fluid injected at engine cylinders. The controller may increase the amount of secondary fluid injected to the engine cylinders in response to an increase in engine temperature, engine knock, or exhaust oxygen content. If the estimated amount of secondary fluid injection does not match the desired amount of secondary fluid injection, the controller may adjust the amount of secondary fluid injected to the engine cylinders until the difference between the estimated and desired amounts of secondary fluid injection is less than a threshold difference. In one example, the threshold difference may occur for a duration before the controller adjusts the secondary fluid injection amount, the duration including one or more of a number of engine cycles, a period of time, or a duration of engine use. Further, the desired amount of secondary fluid injection may be based on engine operating conditions including one or more of engine knock, engine temperature, amount of exhaust gas in the engine cylinder, and oxygen content of the exhaust gas.

Moving on to FIG. 6, a method 600 is shown for determining a water content (e.g., water composition) of secondary fluid used for injection at an engine cylinder. When a fluid level of secondary fluid in a secondary fluid reservoir is low or below a lower threshold level, a user may choose to refill the secondary fluid when the engine is not in use. However, secondary fluids of varying brands or from varying geographical locations may have different water compositions (e.g., different ratios of water to methanol). As discussed above, a secondary fluid injection amount may be based on a desired water injection amount for knock control or based on additional engine operating conditions. Thus, the amount of secondary fluid used for injection at engine cylinders may need to be adjusted for secondary fluids of varying water compositions in order to inject an appropriate amount of water for the engine operating conditions. In this way, it may be beneficial to consider the concentration of water of any added secondary fluid when determining the desired secondary fluid amount to be injected to the engine, as described in FIG. 4. Instructions for carrying out method 600 may be stored on a memory of a controller (e.g., read only memory chip 106 of controller 12 shown in FIG. 1). As such, the controller may execute method 600 based on signals received from various engine sensors.

Method 600 begins at 602 where the controller (e.g., such as controller 12 from FIG. 1) estimates and/or measures engine operating conditions based on feedback from a plurality of engine sensors. Engine operating conditions may include engine speed and load, engine temperature, exhaust temperature, engine knock, an oxygen concentration of the exhaust gas, etc. Based on the engine operating conditions, the controller then determines if a secondary fluid re-filling event has occurred since the last estimate of the water content in the secondary fluid. In one example, to determine if a re-filling event has occurred, the controller may compare the amount of secondary fluid stored in a secondary fluid reservoir (e.g. reservoir 76) to the most recent estimate of the secondary fluid amount. Since a user may choose to re-fill secondary fluid when the engine is not in use, in one embodiment, the controller may estimate the amount of secondary fluid in the secondary fluid reservoir every time the engine is started. For example, the secondary fluid reservoir may include a fluid level sensor. In another embodiment, the controller may estimate the amount of secondary fluid in the secondary fluid reservoir once a duration has passed since the most recently stored secondary fluid estimate. The duration may be an amount of time, number of engine cycles, or number of engine starts. If the secondary fluid amount less than a threshold amount different from the most recent estimate of the stored secondary fluid amount, then the controller may determine that a re-filling event has not occurred and proceed to 606. At 606, the controller may use a previously determined secondary fluid water content estimate (e.g., the fraction of water in the secondary fluid) to determine a desired amount of secondary fluid to be injected to the engine cylinders, as discussed above in the method of FIG. 4.

If the controller determines that a secondary fluid re-filling event has occurred since the estimate of water content of the secondary fluid, then the method may proceed to 608. At 608, the controller may inject a known fraction of secondary fluid at the engine cylinder. The known fraction of secondary fluid may be a fraction of secondary fluid injected in a total fluid injection amount for a single injection event at an engine cylinder. For example, the total fluid injection amount may include an amount of secondary fluid and an amount of primary fuel or may include only secondary fluid (in which the fraction of secondary fluid would be 100%). In one example, 60% secondary fluid may be injected while 40% primary fuel is injected into the engine cylinder. Any ratio of secondary fluid to primary fuel may be injected, so long as the fraction of secondary fluid is greater than zero.

At 610, the method may include determining the total water concentration in the exhaust following the injection of the known fraction of secondary fluid at the engine cylinder. The method at 610 may follow the method outlined in the method of FIG. 3, as described above. For example, following injection of the known fraction of secondary fluid at the engine cylinder, the method may include increasing a reference voltage of the oxygen sensor (e.g., exhaust oxygen sensor) from a lower first voltage to a higher second voltage and determining the change in pumping current between the first and second reference voltage. The change in pumping current may then be converted to a total water concentration in the exhaust from combusting the fraction of secondary fluid. Said another way, the change in pumping current at 610 may be representative of the total amount of water in the exhaust gas.

The method continues on to 612 to determine the amount of water in the secondary fluid based on the total water concentration in the exhaust gas as determined at 610, the fraction of secondary fluid injected at 608, and a water concentration (e.g., composition or fraction) in the primary fuel. The water concentration in the primary fuel may be a known and constant value that is based on the fuel type. As such, the water concentration of the primary fuel may be stored in the memory of the controller. In another example, the controller may look up the stored water concentration of the primary fuel based on the fuel type of the primary fuel. The method at 612 may include determining the water content of the secondary fluid using the following relationship:

$$H_2O\_SF = [H_2O\_total - (H_2O\_primary/(1 - SF\_frac))] * (1/(SF\_frac)),$$

where $H_2O\_SF$ is the water content of the secondary fluid, $H_2O\_total$ is the total water concentration in the exhaust gas (determined at 610), $H_2O\_primary$ is the water concentration in the primary fuel, and $SF\_frac$ is the fraction of secondary fluid injected at 608. The fraction of water in the secondary fluid may then be used to determine the fraction of other constituents in the secondary fluid. For example, if the secondary fluid is washer fluid made up of water and methanol, the determined fraction of water in the secondary fluid may then be used to determine the fraction of methanol in the secondary fluid. The method at 612 may include storing the determined fraction of water in secondary fluid within a memory of the controller (e.g., within a look-up table).

After determining the water content of the secondary fluid, the method continues on to 614 to adjust the secondary fluid injection amount based on the determined concentration of water in the secondary fluid in method 400 of FIG. 4. For example, the method at 408 may include looking up in the memory of the controller the most recently stored value of the water composition of secondary fluid being injected into the engine cylinders. For example, if the water composition of the secondary fluid has decreased since a previous estimate, the desired secondary fluid injection amount determined in method 400 may be higher than a previous amount. Likewise, if the water composition of the secondary fluid has increased since a previous estimate, the desired secondary fluid injection amount may be lower than a previous amount. In this way, the optimal amount of water for the current engine operating conditions may be determined and used for increased engine control, including reducing knock while also reducing engine oil dilution.

In this way, a method may include adjusting an amount of secondary fluid injected at an engine cylinder to a desired amount in an engine, such as a dual fuel engine. The desired amount of secondary fluid for injection into the engine cylinder may be determined by various engine operating conditions such as engine knock, engine temperature, amount of exhaust gas in the engine cylinder, and oxygen content of the exhaust gas. The desired amount of secondary fluid may also be based on a water composition of the secondary fluid. In one example, the water composition of the secondary fluid may be based on an output of an exhaust variable voltage (VVs) oxygen sensor upon injecting a known fraction of secondary fluid at an engine cylinder. More specifically, an amount of secondary fluid injection may be adjusted based on the fraction of water in the secondary fluid, the fraction of water in the secondary fluid based on a change in pumping current of the exhaust oxygen sensor between a first and second reference voltage when a known ratio of secondary fluid to fuel is injected into the engine cylinder following a secondary fluid re-filling event.

An estimate of the actual amount of secondary fluid injected to the engine cylinder may be determined based on feedback from the exhaust VVs oxygen sensor. First, an estimate of the water concentration in the exhaust gas may be obtained by adjusting a reference voltage of the variable voltage oxygen sensor between a lower first voltage at which water is not dissociated at the sensor and a higher second voltage at which water is dissociated at the sensor and comparing the associated pumping currents. Second, exhaust water concentrations may be estimated under two different conditions, one when only primary fuel is injected into the engine cylinder and another when both primary fuel and secondary fluid are injected into the engine cylinder. By comparing the two water concentrations, the actual amount of secondary fluid injected to the engine cylinders may be estimated. A technical effect is achieved by adjusting an amount of secondary fluid injected at an engine cylinder to more closely match a desired amount based on engine operating parameters. The amount of secondary fluid injected at an engine cylinder is adjusted based on a difference between an estimated secondary fluid injection amount estimated from outputs of an oxygen sensor outputs and a desired secondary fluid injection amount determined by engine operation conditions. As a result, the secondary fluid injection amount may be controlled with increased accuracy to a level that reduces knock while also reducing condensation within the cylinder. Specifically, engine knock may be mitigated by increasing the secondary fluid injection amount if the estimated amount of secondary fluid injected at the engine cylinders is less than desired (e.g., less than a determined desired amount). Additionally, conditions in which oil is diluted with water or water condenses within the engine cylinder may be reduced by decreasing the secondary fluid injection amount if the estimated amount is greater than desired. Thus, by more accurately measuring the amount of secondary fluid being injected to an engine cylinder, the secondary fluid injection amount can be adjusted to more precisely match a desired amount that mitigates knock, oil dilution, and water condensation in a dual fuel engine, thereby mitigating degradation of the engine.

In another representation, a method for an engine comprises: during a first condition when only a first fuel is being injected into an engine cylinder, operating an exhaust oxygen sensor to determine a first concentration of water in an exhaust gas; during a second condition when the first fuel and a secondary fluid are being injected into the engine cylinder, operating the exhaust oxygen sensor to determine a second concentration of water in the exhaust gas, and adjusting an amount of secondary fluid injected into the engine cylinder based on the first concentration of water and the second concentration of water.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    injecting a first amount of secondary fluid at an engine cylinder;
    determining an estimated amount of secondary fluid injected at the engine cylinder based on a difference between a first change in pumping current of an exhaust oxygen sensor between a first and a second reference voltage when only fuel is injected into the engine cylinder and a second change in pumping current of the exhaust oxygen sensor between the first and the second reference voltage when fuel and the first amount of secondary fluid are injected into the engine cylinder; and
    adjusting an amount of secondary fluid injected at the engine cylinder in response to the estimated amount of secondary fluid being a threshold amount different than a desired amount of secondary fluid injection, the desired amount of secondary fluid injection based on engine operating conditions.

2. The method of claim 1, wherein the engine operating conditions include one or more of engine knock, engine temperature, a temperature of exhaust gas, an amount of exhaust gas in the engine cylinder, and an oxygen content of the exhaust gas.

3. The method of claim 1, further comprising indicating a condition of a secondary fluid injection system of an engine including the engine cylinder when the estimated amount of secondary fluid is the threshold amount different than the desired amount of secondary fluid injection for a duration, the duration including one or more of a number of engine cycles, a period of time, and a duration of engine use.

4. The method of claim 3, wherein the condition of the secondary fluid injection system includes degradation of one or more of a fuel injector injecting secondary fluid into the engine cylinder and an alternate component of the secondary fluid injection system.

5. The method of claim 1, further comprising adjusting the amount of secondary fluid injected at the engine cylinder based on a fraction of water in the secondary fluid, the fraction of water in the secondary fluid based on a third change in pumping current of the exhaust oxygen sensor between the first and the second reference voltage when a known ratio of secondary fluid to fuel is injected into the engine cylinder following a secondary fluid re-filling event.

6. The method of claim 1, wherein the exhaust oxygen sensor is a variable voltage oxygen sensor and wherein the second reference voltage is higher than the first reference voltage.

7. The method of claim 1, wherein the exhaust oxygen sensor is positioned in an exhaust passage of an engine downstream from the engine cylinder.

8. The method of claim 1, wherein the engine is a dual fuel engine where the fuel is a primary fuel and the secondary fluid is water.

9. A method, comprising:
   injecting a first amount of secondary fluid at an engine cylinder;
   determining an estimated amount of secondary fluid injected at the engine cylinder based on a first change in pumping current of an oxygen sensor when a reference voltage of the oxygen sensor is increased from a first to a second reference voltage, the oxygen sensor positioned downstream of the engine cylinder, during the injecting the first amount of secondary fluid, and a second change in pumping current of the oxygen sensor when the reference voltage of the oxygen sensor is increased from the first to the second reference voltage during only injecting a first fuel at the engine cylinder; and
   injecting a second amount of secondary fluid at the engine cylinder, the second amount adjusted from the first amount based on the estimated amount of secondary fluid injected at the engine cylinder.

10. The method of claim 9, further comprising determining the estimated amount of secondary fluid injected at the engine cylinder based on a difference between the first change in pumping current and the second change in pumping current, wherein the first change in pumping current is indicative of a first amount of water in the first fuel and secondary fluid, and wherein the second change in pumping current is indicative of a second amount of water in the first fuel.

11. The method of claim 10, wherein injecting the second amount of secondary fluid includes increasing injection of secondary fluid from the first amount to the second amount when the difference between the first change and the second change is less than a desired water injection amount.

12. The method of claim 11, wherein injecting the second amount of secondary fluid includes decreasing injection of secondary fluid from the first amount to the second amount when the difference between the first change and the second change is greater than the desired water injection amount.

13. The method of claim 11, wherein the desired water injection amount is based on one or more of an engine knock level, a frequency of engine knock, engine temperature, a temperature of exhaust gas, an amount of exhaust gas in the engine cylinder, and an oxygen content of the exhaust gas.

14. The method of claim 13, further comprising following a secondary fluid re-filling event injecting a known fraction of secondary fluid at the engine cylinder and determining a water composition of the secondary fluid based on the known fraction, a water composition of the first fuel, and a third change in pumping current of the oxygen sensor between the first and the second reference voltage, wherein the first amount of secondary fluid is based on the desired water injection amount and the determined water composition of the secondary fluid, and wherein the second amount of secondary fluid is based on the estimated amount of secondary fluid injected at the engine cylinder, the desired water injection amount, and the determined water composition of the secondary fluid.

15. The method of claim 9, wherein the first fuel is a primary fuel and the secondary fluid is water and wherein the oxygen sensor is a variable voltage oxygen sensor adjustable between the first reference voltage, where water is not dissociated at the oxygen sensor, and the second reference voltage, where water is dissociated at the oxygen sensor, the second reference voltage higher than the first reference voltage.

16. The method of claim 9, further comprising injecting the first fuel along with the secondary fluid during the injecting the first amount of secondary fluid.

17. A system for a dual fuel engine, comprising:
   an engine cylinder;
   an exhaust oxygen sensor positioned in an exhaust passage downstream of the engine cylinder;
   a fuel system including a primary fuel tank containing fuel, a secondary tank containing washer fluid, and a fuel injector injecting one or more of fuel and washer fluid into the engine cylinder; and
   a controller with computer readable instructions for:
      adjusting an amount of secondary fluid injected at the engine cylinder based on a difference between a desired secondary fluid injection amount and an estimated secondary fluid injection amount and a water composition of the secondary fluid, the estimated secondary fluid injection amount based on a difference between a first change in pumping current of the exhaust oxygen sensor between a first and a second reference voltage when fuel and secondary fluid are being injected into the engine cylinder and a second change in pumping current of the exhaust oxygen sensor between the first and the second reference voltage when only fuel is being injected into the engine cylinder.

* * * * *